United States Patent Office 3,501,229
Patented Mar. 17, 1970

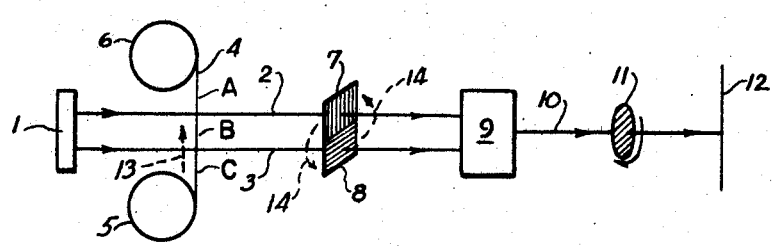
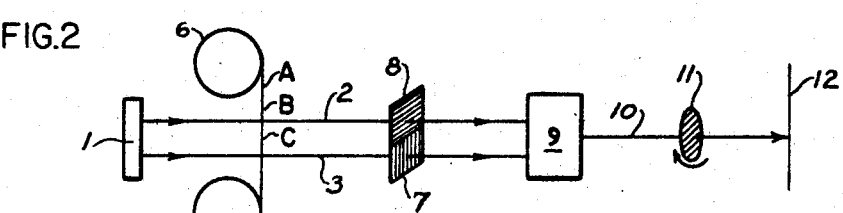
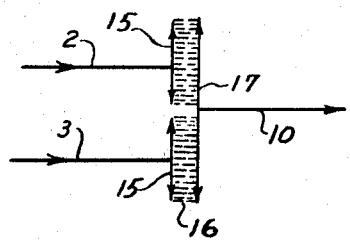
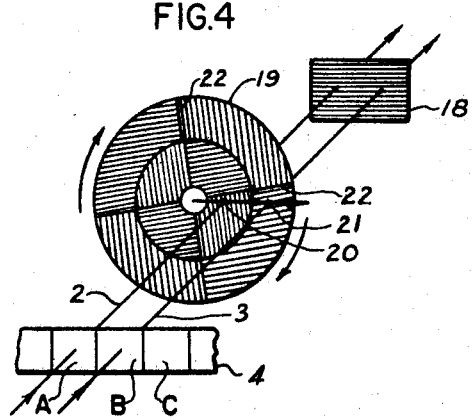
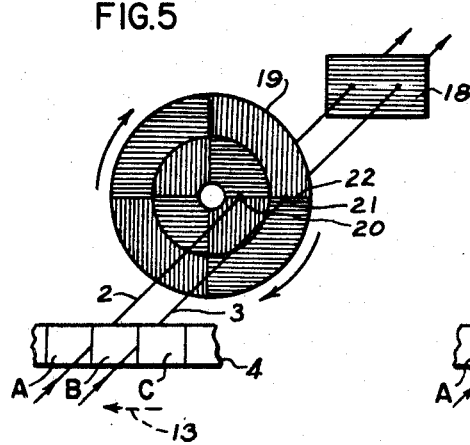
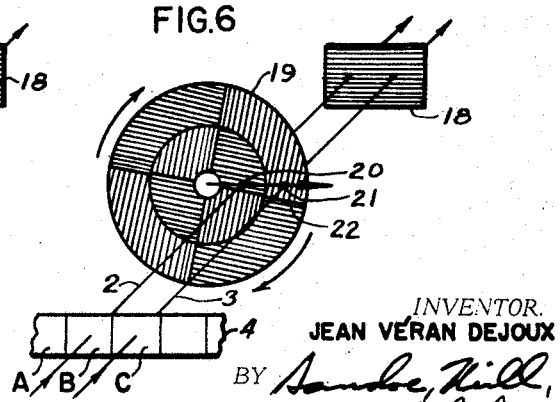
INVENTOR.
JEAN VÉRAN DEJOUX March 17, 1970  J. V. DEJOUX  3,501,229
METHOD AND APPARATUS FOR PROJECTING MOTION PICTURES
Filed March 8, 1967  2 Sheets-Sheet 2
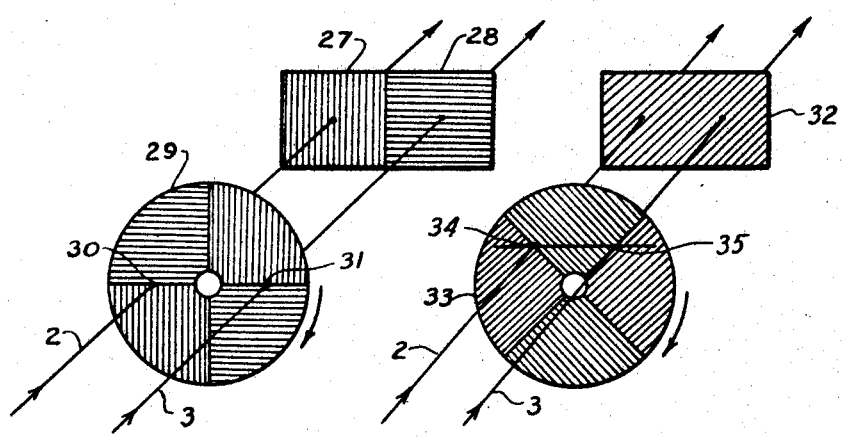
INVENTOR.
JEAN VÉRAN DEJOUX
BY
ATTORNEYS

3,501,229
METHOD AND APPARATUS FOR PROJECTING MOTION PICTURES
Jean Véran Dejoux, Paris, France, assignor, by mesne assignments, to Optical Systems Corporation, New York, N.Y., a corporation of Delaware
Filed Mar. 8, 1967, Ser. No. 621,562
Int. Cl. G03b 21/36, 21/32, 41/00
U.S. Cl. 352—91         7 Claims

ABSTRACT OF THE DISCLOSURE

A method and apparatus for projecting motion pictures for direct viewing, for viewing on a screen, for photographic reproduction, or for transmission by television. A series of pictures recorded in sequence on a single film strip are projected as pairs with the projected images of each pair in superposed relation. The superposed images are dissolved, one into another, between successive advancing movement of the film strip, and the luminous intensities of the respective projected images are adjusted at the beginning of each dissolve.

---

In U.S. Patent No. 3,271,097 dated Sept. 6, 1966, in which I am joint inventor with Jean de Montremy of the inventions disclosed and claimed therein, there is disclosed a method and apparatus for projecting motion pictures in which the recorded pictures are projected as pairs, with the projected images of each pair in superposed position. During the projection of each pair, the luminous intensity of the image of the first picture thereof is decreased gradually from a maximum to zero and the luminous intensity of the image of the second picture of this pair is increased gradually from zero to the same maximum. When the luminous intensity of the image of the first picture which has been decreasing gradually is near zero, the film on which that image is projected is moved out of projection position, and the third picture of the series is moved into projection position so that it is paired with the second picture. Thereafter, the luminous intensity of the image of the third picture is increased gradually while the luminous intensity of the second picture is decreased gradually. The foregoing sequence is then repeated time after time with each new picture which is moved into projection position paired for projection with the preceding picture. The total luminous intensity of the two superposed images remains substantially constant throughout the projection.

This method of projection, which has been referred to as a "lap-dissolve" method, has many advantages, one of the most important of which is that it makes possible a great reduction in the speed of projection. That is, it has been found possible to reduce the rate of projection from 24 frames per second, as commonly used today, to less than ten frames per second without loss of quality of the projected images and without noticeable flicker or other objectionable effects. In fact, projection at rates of six to eight frames per second has been said by some observers to produce projected images superior to those produced by usual methods at a projection rate of 24 per second.

As disclosed in the aforesaid Patent No. 3,271,097, the practice of the process requires the use of two film strips with the sequence of pictures recorded alternately on the two strips. That is, the odd-numbered pictures (1, 3, 5, etc.) are recorded on one film strip, and the even-numbered pictures (2, 4, 6, etc.) are recorded on another film strip. During the projection of such pictures, the two film strips are fed through two film gates, and the strips are advanced in alternation.

It is an object of the present invention to provide a method of projection which makes possible the realization of all of the advantages of the so-called "lap-dissolve" method of projection as disclosed in the aforesaid Patent No. 3,271,097, but which permits the use of a single film strip on which the series of pictures to be projected are recorded in normal sequence as customarily recorded for projection by usual methods.

Other objects and advantages of the invention will appear hereinafter.

According to the present invention, as in the patented invention, the pictures are projected in pairs, with the projected images of each pair in superposed position. Also, as in the patented invention, during the projection of each pair, the luminous intensity of the projected image of one picture is decreased gradually and continuously from a maximum to zero while the luminous intensity of the projected image of the other picture of the pair is increased gradually and continuously from zero to the same maximum.

Thus, according to the present invention, the single film strip carrying the sequence of pictures to be projected is fed to a projection position to expose the first pair of pictures of the sequence to light to project the images of the two pictures in superposed position. During the projection of the first pair of pictures, the luminous intensity of the projected image of the first picture is decreased gradually and continuously from a maximum to zero, while the luminous intensity of the projected image of the second picture is increased gradually and continuously from zero to the same maximum.

According to the present invention, however, when the projection of the first pair of pictures has been substantially completed so that the luminous intensity of the projected image of the first picture has been decreased substantially to zero, and the luminous intensity of the projected image of the second picture has been increased to substantially maximum intensity, the film strip is advanced quickly to move the first picture of the sequence out of projection position, and to move the second and third pictures of the sequence into the projection positions previously occupied by the first and second pictures, respectively.

The advancing movement of the film strip takes place very quickly, as for example, within a time interval such that the movement of the projected images is imperceptible to the eye of the observer. An interval of one twenty-fourth of a second or less, and preferably an interval of the order of one forty-eighth of a second, has been found adequate for this purpose.

Coincidentally with the advancing movement of the film strip, and as the second and third pictures reach the projection positions previously occupied by the first and second pictures, respectively, the luminous intensity of the projected image of the second picture is adjusted to maximum intensity, and the luminous intensity of the projected image of the third picture is adjusted to zero intensity. Then, during the projection of the second pair of pictures, consisting of the second and third pictures, the luminous intensity of the projected image of the second picture is gradually and continuously decreased from maximum to zero, while the luminous intensity of the projected image of the third picture is gradually and continuously increased from zero to the same maximum.

The adjustment of the luminous intensities of the projected images of the second and third pictures also takes place very quickly, i.e., within a time interval similar to that required for the advancing movement of the film strip.

As projection continues, the above described sequence of operations is repeated again and again with the sequence of pictures always projected in pairs as 1–2, 2–3, 3–4 and so on, with the projected images of the successive pictures of each pair being dissolved gradually and continuously one into the other during the projection of each pair of pictures. The total luminous intensity of the two superposed images remains substantially constant throughout the projection.

The invention will be more particularly described with reference to the accompanying drawings, in which, FIGURE 1 is a diagrammatic representation of a projection system with the parts arranged as they would appear at or near the completion of the projection of the first two pictures of a sequence.

FIGURE 2 is a similar view with the parts arranged as they would appear after the first advancing movement of the film strip and at the beginning of the projection of the second and third pictures of a sequence.

FIGURE 3 is a diagrammatic representation of a conventional lens system adapted to superpose the projected images of the pairs of pictures.

FIGURES 4, 5 and 6 are diagrammatic representations of a modified form of the invention, showing three stages of projection, FIG. 4 with the parts arranged as they would appear near the completion of the projection of the first two pictures of the sequence, FIG. 5 with the parts arranged as the would appear at the time of the advancing movement of the film strip, and FIG. 6 with the parts arranged as they would appear just after the beginning of the projection of the second and third pictures of the sequence.

FIGURES 7 and 8 are diagrammatic representations of modified forms of the invention, each with the parts arranged as they would appear at the time of the advancing movement of the film strip.

Referring to FIGS. 1 and 2, the reference numeral 1 designates a conventional source of light including a conventional condenser lens system adapted to direct parallel light beams 2 and 3 toward and through pictures recorded in sequence on a film strip 4, the sequence of individual pictures being indicated by A, B and C.

The film strip is carried on a supply reel 5, and as projection proceeds, is wound onto the takeup reel 6. During its travel from the supply reel to the takeup reel, the strip may be supported in any suitable manner, as by a suitable gate (not shown) having an aperture or apertures defining the projection positions for exposure and projection of a pair of pictures such as the pictures A and B of FIG. 1.

The film strip is advanced intermittently, one picture frame length at a time, by conventional advancing means known in the art, and in a manner as hereinafter described.

Mounted beyond the film strip, in position to intercept the beams 2 and 3 which have passed through the pair of exposed pictures, are a pair of polarizing filters 7, 8, the polarization planes of which are arranged at 90° to each other as indicated by the vertical and horizontal lines of FIGS. 1 and 2. The polarizing filters are mounted for intermittent rotation on an axis parallel to the axes of the light beams for purposes hereinafter explained.

Mounted beyond the polarizing filters 7, 8 is an objective lens system 9 adapted to superpose the projected images of the pairs of pictures and focus them on a projection surface. Such lens systems are known in the art, and may comprise, for example, two small lenses 15, as indicated in FIG. 3, which intercept the beams 2 and 3, respectively, and a larger lens 17, the image focal plane of which coincides with the plane of the projection surface 12.

Mounted beyond the lens system 9, and between the said lens system and the projection surface in position to intercept the beam 10 emanating from the lens system 9 is a polarizing filter 11 which is mounted for continuous rotation on an axis which is parallel to the axis of the beam 10.

During projection, it will be understood that as the polarizing filter 11 rotates, whenever its polarization planes are parallel to the polarization planes of one or the other of the polarizing filters 7, 8, the transmission of light therethrough is substantially unimpeded, and the luminous intensity of the image projected therethrough will be at a maximum. Likewise, whenever the polarization planes of the polarizing filter 11 are at 90° to the polarization planes of one or the other of the polarizing filters 7, 8, the transmission of light is blocked, and the luminous intensity of the image projected therethrough will be substantially zero. Meanwhile, as the polarizing filter 11 rotates, while the polarizing filters 7, 8 remain stationary, the luminous intensity of the two projected images will increase or decrease continuously as the angle between the respective polarization planes of the polarizing filters 7, 8 and the polarization plane of the polarizing filter 11 decreases or increases.

The rate of rotation of the polarizing filter 11 is such that it is rotated through an angle of 90° between successive advancing movements of the film strip. Thus, during the interval between successive advancing movements of the film strip, while the polarizing filters 7, 8 are stationary, rotation of the polarizing filter 11 causes the luminous intenity of the projected image of one picture of the pair being projected to be decreased from maximum to zero, while the luminous intensity of the projected image of the other picture of the pair is increased from zero to maximum, while the total luminous intensity of the superposed images remains substantially constant.

In FIG. 1, the parts are shown in the position which they would occupy at the completion of the projection of the first two pictures A and B of the recorded sequence. At this point, the luminous intensity of the projected image of picture A has been decreased substantially to zero due to the fact that the polarization planes of the polarizing filters 7 and 11 are displaced by 90°. At the same time, the luminous intensity of the projected image of picture B has been increased to maximum due to the fact that the polarization planes of the polarizing filters 8 and 11 are parallel.

At or near this point, the film strip 4 is quickly advanced one picture frame length to move the picture A out of projection position and to move the pictures B and C to the projection positions previously occupied by the pictures A and B, respectively, as shown in FIG. 2.

Coincidentally with this advancing movement of the film strip, the polarizing filters 7, 8 are rotated quickly through 180° so that, as shown in FIG. 2, the polarization planes of the filter 8 are again parallel to those of the filter 11, while the polarization planes of the filter 7 are disposed at 90° to those of the filter 11. This quickly adjusts the luminous intensity of the projected image of picture B to maximum and adjusts the luminous intensity of the projected image of picture C to zero.

It will be understood that since the advancing movement of the film strip and the rotating movement of the polarizing filters 7, 8 cannot be effected instantaneously, but require a short interval of time as hereinbefore explained, these movements may be initiated slightly before and be completed slightly after the polarization planes of the respective polarizing filters are in precise positions of parallelity and 90° displacement. However, because of the extremely short interval required for such movements, and for simplicity of description, these movements have been assumed to take place instantaneously in the foregoing.

Thereafter, while the film strip is retained in the position shown in FIG. 2, as the polarizing filter rotates through another 90, the luminous intensity of the projected image of picture B decreases to zero, while the luminous intensity of the projected image of picture C increases to maximum. Then the film strip is again advanced, the polarizing filters 7, 8 are again rotated through 180°, and the cycle is repeated again and again.

It is a characteristic of polarizing filters that as the polarization planes of the filter 11 change with respect to the polarization planes of the filters 7 and 8, respectively, the luminous intensity of each of the projected images changes uniformly over the entire area of the projected image. Moreover, the rate of decreases of luminous intensity of the one image is substantially equal to the rate of increase of luminous intensity of the other image, so that the total luminous intensity of the two superposed images remains substantially constant throughout the projection.

In the modification illustrated in FIGS. 4, 5 and 6, the polarizing filters 7 and 8 of FIGS. 1 and 2 are replaced by the polarizing filters of the disk 19, and the polarizing filter 11 is replaced by the polarizing filter 18. The planes of polarization of the respective filters is indicated by the vertical and horizontal lines. The disk 19 is mounted for rotation, but the polarizing filter 18 is stationary. The disk 19 is mounted between the film strip 4 and the optical system 9 in the same relative location as the polarizing filters 7, 8 of FIGS. 1 and 2. As shown in FIGS. 4, 5 and 6, the stationary polarizing filter 18 is located between the disk 19 and the optical system 9, but it may also be located beyond the optical system 9 in the same relative location as the polarizing filter 11 in FIGS. 1 and 2.

The disk 19 comprises two concentric filter rings, one within the other, with each ring comprising a plurality of segments of polarizing filter material, with the polarization planes of the adjacent segments of each ring displaced at 90°, and the polarization planes of the segments of the inner ring displaced at 90° from the adjacent corresponding segments of the outer ring, all as indicated diagrammatically by the lines of FIGS. 4, 5 and 6. In the form shown in FIGS. 4, 5 and 6, there are four segments in each ring with successive segments separated by radial lines 22.

When the parts are in the position of FIG. 4, the projection of pictures A and B is nearing completion, with the beam 2 passing through two polarizing filters, the polarization planes of which are displaced by nearly 90°, so that the luminous intensity of the projected image of picture A is approaching zero. At the same time, the beam 3 is passing through two polarizing filters, the polarization planes of which are nearly parallel, so that the luminous intensity of the projected image of picture B is approaching maximum.

The disk 19 is rotating in clockwise direction at a rate such that it rotates through an angle of 90° between successive advancing movements of the film strip. At or near the position shown in FIG. 4, the advancing movement of the film strip begins, which said advancing movement reaches its midpoint at approximately the time when the beams 2 and 3 cross the radial line 22. Thus, when the advancing movement of the film strip is completed, at or before the position shown in FIG. 6, the orientation of the polarization planes of the polarizing filters traversed by the beams 2 and 3 is quickly reversed to adjust the luminous intensity of the projected image of picture B to maximum and to adjust the luminous intensity of the projected image of picture C to zero. Thereafter, as rotation of the disk 19 continues during projection of pictures B and C, the luminous intensity of the projected image of picture B decreases, while the luminous intensity of the projected image of picture C increases as previously explained.

In the modification shown in FIG. 7, the polarizing filters 7, 8 of FIG. 1 are replaced by the polarizing filters of the disk 29 and the polarizing filter 11 is replaced by the polarizing filters 27, 28. The disk 29 is mounted for rotation, but the polarizing filters 27, 28 are stationary. The disk 29 and the polarizing filters 27, 28 are both mounted between the film strip 4 and the optical system 9.

In the modification shown in FIG. 8, the polarizing filters 7, 8 of FIG. 1 are replaced by the polarizing filters of the disk 33 and the polarizing filter 11 is replaced by the polarizing filter 32. The disk 33 is mounted for rotation, but the polarizing filter 32 is stationary. The disk 33 is mounted between the film strip 4 and the optical system 9. As shown in FIG. 8, the polarizing filter 32 is also mounted between the film strip 4 and the optical system 9, but it may also be located beyond the optical system 9 in the same relative position as the polarizing filter 11 of FIGS. 1 and 2.

In the modifications of FIGS. 7 and 8, the disks 29 and 33 are also rotated in clockwise direction at a rate such that they rotate through an angle of 90° between successive advancing movements of the film strip. The positions shown in FIGS. 7 and 8 correspond to the position of FIG. 5, and the operation of these modifications is similar to that described with respect to FIGS. 4, 5 and 6.

It will be understood that the invention may be variously modified and embodied within the scope of the subjoined claims.

I claim as my invention:

1. The method of projecting motion pictures in which a series of images are projected from a series of pictures recorded in sequence on a single film strip, which comprises, feeding said film strip to a projection position to expose the first and second pictures of the sequence to light to project the images thereof simultaneously in superposed relation, decreasing the luminous intensity of the projected image of the first of said pictures from maximum intensity to substantially zero intensity while simultaneously increasing the luminous intensity of the projected image of the second of said pictures from substantially zero intensity to substantially maximum intensity, thereafter advancing said film strip to move the second and third pictures of the sequence to the projection positions previously occupied by the first and second pictures, respectively, to expose the second and third pictures to light to project the images thereof simultaneously in superposed relation, adjusting the luminous intensity of the projected image of the second picture to substantially maximum intensity and simultaneously adjusting the luminous intensity of the projected image of the third picture to substantially zero intensity, and thereafter decreasing the luminouse intensity of the projected image of the second of said pictures from substantially maximum intensity to substantially zero intensity while simultaneously increasing the luminous intensity of the projected image of the third of said pictures from substantially zero intensity to substantially maximum intensity, the total luminous intensity of the superposed images remaining substantially constant over the entire area thereof throughout the projection.

2. The method claimed in claim 1 in which the adjustment of the luminous intensities of the projected images of the second and third pictures is made coincidentally with the advancing movement of said film strip.

3. The method claimed in claim 1 in which the advancing movement of the film strip and the adjustment of the luminous intensities of the second and third pictures is made in an interval not exceeding one twenty-fourth of a second.

4. The method claimed in claim 2 in which the advancing movement of the film strip and the adjustment of the luminous intensities of the second and third pictures is made in an interval not exceeding one twenty-fourth of a second.

5. The method of projecting motion pictures in which a series of images are projected from a series of pictures recorded in sequence on a single film strip, which comprises, projecting images of a pair of said pictures simultaneously in superposed relation while said pictures are held at a projection position, decreasing the luminous intensity of the projected images of the first of said pictures while increasing the luminous intensity of the projected image of the second of said pictures, moving the first of said pictures out of projection position, moving the second of said pictures to the projection position previously occupied by the first, moving a third picture to the projection position previously occupied by the second, adjusting the luminous intensities of the projected images of the second and third pictures, projecting images of the new pair of pictures simultaneously in superposed relation, decreasing the luminous intensity of the projected image of the second picture while increasing the luminous intensity of the projected image of the third picture.

6. Apparatus for projecting motion pictures in which a film strip having a sequence of pictures recorded thereon is fed intermittently through a projection position, means for passing beams of light simultaneously through a pair of pictures at said projection position, an optical system for transmitting said beams to project the images of the pair of recorded pictures exposed at said projection position simultaneously in superposed position, means for advancing said film strip intermittently through said projection position after projection of each pair, means interposed in said optical system for decreasing the luminous intensity of the projected image of one of said pictures from maximum intensity to zero while simultaneously increasing the luminous intensity of the other of said pictures from zero to maximum intensity during the projection of each pair and for quickly adjusting the luminous intensities of the projected images of the two recorded pictures at said projection position at the beginning of the projection of each next pair of pictures.

7. Apparatus as claimed in claim 6 in which said means interposed in said optical system comprises a plurality of relatively movable polarizing filters.

References Cited

UNITED STATES PATENTS

| | | | |
|---|---|---|---|
| 1,714,849 | 5/1929 | Daponte. | |
| 1,978,250 | 10/1934 | Dilks | 352—86 |
| 2,729,138 | 1/1956 | Bernier | 352—60 |

FOREIGN PATENTS

| | | |
|---|---|---|
| 29,051 | 1904 | Great Britain. |
| 565,540 | 11/1923 | France. |
| 1,274,828 | 9/1961 | France. |

JULIA E. COINER, Primary Examiner

U.S. Cl. X.R.

352—41, 68